(12) United States Patent
Yao

(10) Patent No.: US 9,173,219 B2
(45) Date of Patent: Oct. 27, 2015

(54) METHOD, APPARATUS AND SYSTEM FOR IMPROVING DATA TRANSMISSION PERFORMANCE

(71) Applicant: Huawei Device Co., LTD, Shenzhen (CN)

(72) Inventor: Wenfeng Yao, Shenzhen (CN)

(73) Assignee: Huawei Device Co., LTD., Shenzhen (CN)

( * ) Notice: Subject to any disclaimer, the term of this patent is extended or adjusted under 35 U.S.C. 154(b) by 201 days.

(21) Appl. No.: 13/918,582

(22) Filed: Jun. 14, 2013

(65) Prior Publication Data

US 2014/0003368 A1 Jan. 2, 2014

(30) Foreign Application Priority Data

Jun. 18, 2012 (CN) .......................... 2012 1 0201139

(51) Int. Cl.
*H04J 1/16* (2006.01)
*H04W 72/04* (2009.01)
*H04W 36/26* (2009.01)

(52) U.S. Cl.
CPC .......... *H04W 72/0453* (2013.01); *H04W 36/26* (2013.01)

(58) Field of Classification Search
CPC .. H04W 28/22; H04L 1/0002; H04L 27/2657
USPC .............................. 370/232, 330; 375/E1.033
See application file for complete search history.

(56) References Cited

U.S. PATENT DOCUMENTS

| 6,070,060 | A | * | 5/2000 | Edelman ........................ 455/102 |
| 2002/0188723 | A1 | | 12/2002 | Choi et al. |
| 2003/0185158 | A1 | * | 10/2003 | Lucas et al. .................... 370/252 |
| 2004/0203459 | A1 | | 10/2004 | Borras-Chia et al. |
| 2005/0083850 | A1 | * | 4/2005 | Sin et al. ........................ 370/252 |
| 2007/0115892 | A1 | * | 5/2007 | Lee et al. ....................... 370/333 |

(Continued)

FOREIGN PATENT DOCUMENTS

| CN | 1462523 A | 12/2003 |
| CN | 101720561 A | 6/2010 |

(Continued)

OTHER PUBLICATIONS

Chinese Office Action received in Application No. 201210201139.3 mailed May 6, 2014, 6 pages.

(Continued)

*Primary Examiner* — Dang Ton
*Assistant Examiner* — Sai Aung
(74) *Attorney, Agent, or Firm* — Slater & Matsil, L.L.P.

(57) ABSTRACT

A method, an apparatus and a system can be used for improving data transmission performance. Specific steps may include determining whether a transmission rate for transmitting data is lower than a reference transmission rate that the data is actually required. If it is lower than the reference transmission rate, a reference working frequency is obtained by querying part of or an entire working frequency band. The reference working frequency corresponds to a transmission rate that is higher than or equal to the reference transmission rate from the working frequency band. Frequency modification indication information is sent to a network access device and a working frequency for communication is modified to the reference working frequency.

11 Claims, 3 Drawing Sheets

(56) References Cited

U.S. PATENT DOCUMENTS

| | | |
|---|---|---|
| 2008/0008151 A1 | 1/2008 | Li et al. |
| 2008/0279294 A1* | 11/2008 | Yang et al. .................... 375/260 |
| 2008/0280615 A1 | 11/2008 | Vinayakray-Jani |
| 2009/0034593 A1* | 2/2009 | Chuang ........................ 375/222 |
| 2010/0157930 A1 | 6/2010 | Kuwahara et al. |
| 2010/0177654 A1 | 7/2010 | Charbit et al. |
| 2010/0296596 A1 | 11/2010 | Miyamoto |
| 2012/0008570 A1 | 1/2012 | Li et al. |
| 2012/0263130 A1 | 10/2012 | Ishikura et al. |

FOREIGN PATENT DOCUMENTS

| | | |
|---|---|---|
| CN | 102740376 A | 10/2012 |
| EP | 1937026 A2 | 6/2008 |
| JP | 2002330467 A | 11/2002 |
| JP | 2004221710 A | 8/2004 |
| JP | 2013532452 A | 8/2013 |
| JP | 20133532452 A | 8/2013 |
| WO | 2004042971 A1 | 5/2004 |
| WO | 2009110054 A1 | 9/2009 |
| WO | 2011065407 A1 | 6/2011 |
| WO | 2012006459 A1 | 1/2012 |

OTHER PUBLICATIONS

Notice of Reasons for Rejection received in Japanese Application No. 2013-126531 mailed Apr. 22, 2014, 5 pages.
Extended European Search Report received in Application No. 13172418.9-1854 mailed Jul. 31, 2013, 8 pages.
International Search Report and Written Opinion received in Application No. PCT/CN2013/077382 mailed Sep. 19, 2013, 12 pages.

* cited by examiner

METHOD, APPARATUS AND SYSTEM FOR IMPROVING DATA TRANSMISSION PERFORMANCE

CROSS-REFERENCE TO RELATED APPLICATIONS

This application claims priority to Chinese Patent Application No. 201210201139.3, filed on Jun. 18, 2012, which is hereby incorporated by reference in its entirety

TECHNICAL FIELD

The present invention relates to the field of communication technologies, and in particular, to a method, an apparatus and a system for improving data transmission performance.

BACKGROUND

A 5 GHz WiFi (Wireless Fidelity, Wireless Fidelity) frequency band works on a bandwidth ranging from 4910 MHz to 5835 MHz. Signal strength attenuation may occur no matter what frequency a terminal uses for transmitting data. Therefore, when a terminal transmits data using a certain frequency in a 5 GHz WiFi frequency band, data transmission performance dramatically decreases after signal strength attenuation occurs, which may result in a problem such as delayed data transmission, or data loss. At the meantime, 60 GHz and 2.4 GHz WiFi frequency bands also encounter the problem. The prior art does not provide a method for solving the problem.

SUMMARY

Embodiments of the present invention provide a method, an apparatus and a system for improving data transmission performance, and solve the problem of low performance of data transmission caused by signal strength attenuation when a terminal transmits data by using a 5 GHz WiFi frequency band.

To achieve the above objective, the embodiments of the present invention adopt the following technical solutions:

In one aspect, a method for improving data transmission performance is provided, including:

determining whether a transmission rate for transmitting data is lower than a reference transmission rate that the data is actually required;

if lower than the reference transmission rate, by querying part of or an entire working frequency band, obtaining a reference working frequency corresponding to a transmission rate that is higher than or equal to the reference transmission rate from the working frequency band;

sending frequency modification indication information to a network access device, so that the network access device modifies its working frequency for communicating with a terminal that sends the frequency modification indication information to the reference working frequency according to the frequency modification indication information, where the frequency modification indication information includes the reference working frequency; and modifying the working frequency for communication to the reference working frequency.

In addition, another method for improving data transmission performance is further provided, including:

receiving, by a network access device, frequency modification indication information sent by a terminal, where, the frequency modification indication information includes a reference working frequency, the reference working frequency is obtained by querying part of or an entire working frequency band from the working frequency band after the terminal determines that a transmission rate for transmitting data is lower than a reference transmission rate that the data is actually required, and the reference working frequency corresponds to a transmission frequency that is higher than or equal to the reference transmission rate; and modifying a working frequency for communication between the network access device and the terminal to the reference working frequency according to the frequency modification indication information.

In another aspect, an apparatus for improving data transmission performance is provided, including a terminal and a network access device.

A terminal includes:

a comparator, configured to determine whether a transmission rate for transmitting data is lower than a reference transmission rate that the data is actually required, where the comparator sends a notification message to a processor if the comparator determines that the transmission rate for transmitting data is lower than the reference transmission rate;

the processor, configured to obtain, by querying part of or an entire working frequency band, a reference working frequency from the working frequency band according to the notification message sent by the comparator, where the reference working frequency corresponds to a transmission frequency that is higher than or equal to the reference transmission rate, and send the reference working frequency to a transmitter; and modify a working frequency for communication between a network access device and the terminal to the reference working frequency; and the transmitter, configured to receive the reference working frequency sent by the processor and transmit frequency modification indication information to the network access device so that the network access device modifies the working frequency for communication to the reference working frequency according to the frequency modification indication information, where the frequency modification indication information includes the reference working frequency obtained by the processor.

A network access device includes:

a receiver, configured to receive frequency modification indication information sent by a terminal, where the frequency modification indication information includes a reference working frequency, the reference working frequency is obtained by querying part of or an entire working frequency band from the working frequency band after the terminal determines that a transmission rate for transmitting data is lower than a reference transmission rate that the data is actually required, and the reference working frequency corresponds to a transmission frequency that is higher than or equal to the reference transmission rate; and a processor, configured to modify a working frequency for communication between the network access device and the terminal to the reference working frequency according to the frequency modification indication information received by the receiver.

In still another aspect, a system for improving data transmission performance is provided, including:

a terminal, configured to determine whether a transmission rate for transmitting data is lower than a reference transmission rate that the data is actually required; if lower than the reference transmission rate, by querying part of or an entire working frequency band, obtain a reference working frequency corresponding to a transmission frequency that is higher than or equal to the reference transmission rate from the working frequency band; send frequency modification indication information to a network access device, so that the network access device modifies its working frequency for communicating with the terminal to the reference working frequency according to the frequency modification indication information, where the frequency modification indication information includes the reference working frequency; and modify the working frequency for communication to the reference working frequency; and the network access device, configured to receive the frequency modification indication information sent by the terminal; and modify the working frequency for communication to the reference working frequency according to the frequency modification indication information.

The embodiments of the present invention provide a method, an apparatus and a system for improving data transmission performance. Through adopting the solution, after a terminal determines that a transmission rate is lower than a reference transmission rate, obtain working frequencies corresponding to transmission rates that are higher than the reference transmission rate from the entire working frequency band; in addition, the terminal determines a reference working frequency among working frequencies corresponding to transmission rates that are higher than the reference transmission rate as the working frequency for communicating between the terminal and a network access device, and at the meantime, sends frequency modification indication information carrying the reference working frequency to the network access device so that the network access device modifies its working frequency for communicating with the terminal to the reference working frequency. In this way, the terminal may transmit data at a transmission rate higher than a reference transmission rate, thereby effectively relieving transmission rate decrease caused by signal strength attenuation, and further improving data transmission performance.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings according to these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art according to the embodiments of the present invention without creative efforts shall fall within the protection scope of the present invention.

When a terminal performs communication on a 5 GHz WiFi frequency band, a transmission rate for transmitting data dramatically decreases after signal strength attenuation occurs, thereby further resulting in a severe deterioration of data transmission performance.

Embodiment 1

Figure 1:
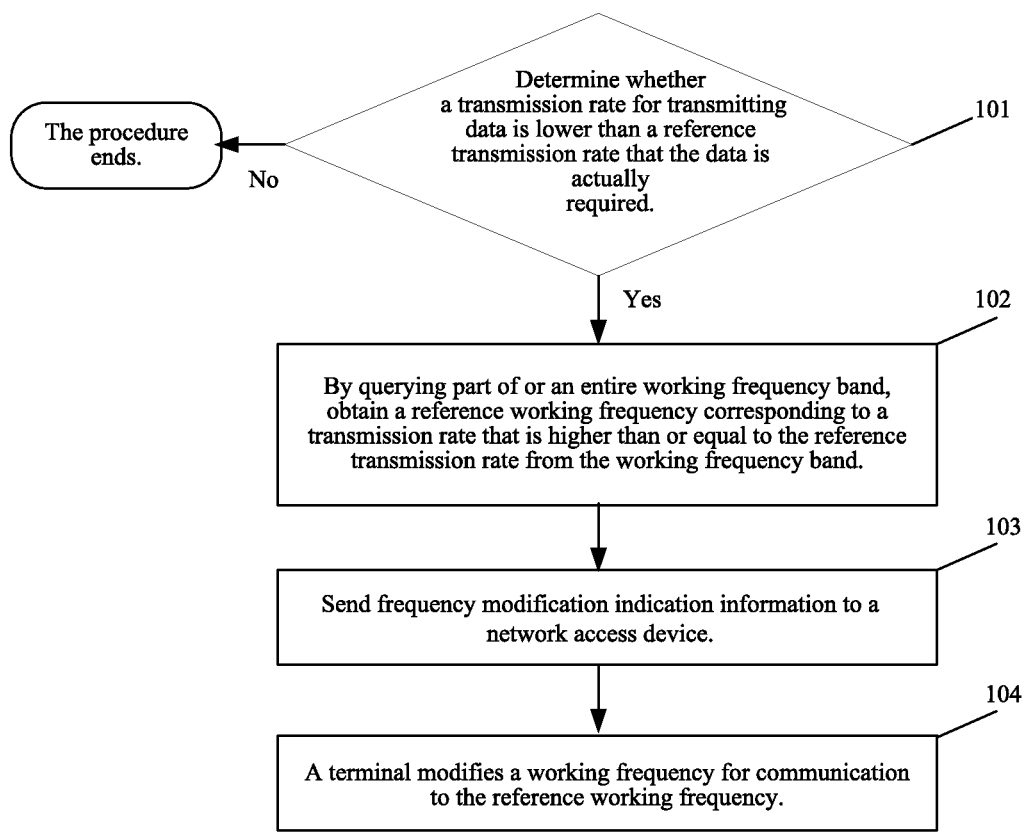
FIG. 1 is a flowchart of a method for improving data transmission performance according to an embodiment of the present invention.

To address the problem, this embodiment provides a method for improving data transmission performance, where the executive entity is a terminal. As shown in FIG. 1, the following steps may be included:

Step 101: Determine whether a transmission rate for transmitting data is lower than a reference transmission rate that the data is actually required.

Some services of a terminal have a strict requirement for a transmission rate. A too low transmission rate for transmitting data of a service may result in delayed data transmission of the service or even data loss, thereby further deteriorating user experience of the service.

Specifically, a terminal determines whether a transmission rate for transmitting data is lower than a reference transmission rate. If the transmission rate is lower than the reference transmission rate, it indicates that the transmission rate of the terminal is too low; if the transmission rate is higher than or equal to the reference transmission rate, it indicates that the transmission rate of the terminal may be not too low.

If lower than the reference transmission rate, perform step 102; if higher than or equal to the reference transmission rate, the procedure ends.

Step 102: By querying part of or an entire working frequency band, obtain a reference working frequency corresponding to a transmission rate that is higher than or equal to the reference transmission rate from the working frequency band.

A terminal may work on any working frequency of the entire working frequency band. If the transmission rate is lower than the reference transmission rate, it indicates that the transmission rate of the terminal is too low. To ensure that the transmission rate of the terminal is not too low, the terminal may obtain, by querying part of or an entire working frequency band, a reference working frequency corresponding to a transmission rate that is higher than or equal to the reference transmission rate from the working frequency band.

Step 103: Send frequency modification indication information to a network access device, so that the network access device modifies its working frequency for communicating with a terminal that sends the frequency modification indication information to the reference working frequency according to the frequency modification indication information, where the frequency modification indication information includes the reference working frequency.

For the purpose that a network access device may use a reference working frequency to perform data transmission with a terminal, frequency modification indication information that includes a reference working frequency is sent to the network access device, so that the network access device modifies its working frequency for communicating with the terminal that sends the frequency modification indication information to the reference working frequency.

In step 102, the reference working frequency obtained by the terminal may be a working frequency that makes a transmission rate higher than a reference transmission rate. Modifying a working frequency for communication between the network access device that the terminal belongs to and the terminal to the reference working frequency may increase the transmission rate for transmitting data between the terminal and the network access device, and keep the transmission rate higher than the reference transmission rate, or in other words, the transmission requirement of the service data may be satisfied, thereby further ensuring that an experience of a user that uses service data transmitted by the terminal and the network access device does not deteriorates.

Step 104: A terminal modifies the working frequency for communication to a reference working frequency.

When the network access device that a terminal belongs to modifies the working frequency for communicating with the terminal to the reference working frequency, the terminal modifies the working frequency to the reference working frequency at the same time, so that the terminal may use the reference working frequency during data transmission, thereby increasing the transmission rate of the terminal and ensuring that the transmission rate is higher than or equal to the reference working frequency.

Through adopting the solution, after a terminal determines that a transmission rate is lower than a reference transmission rate, obtain working frequencies corresponding to transmission rates that are higher than the reference transmission rate from the entire working frequency band; in addition, the terminal determines a reference working frequency among working frequencies corresponding to transmission rates that are higher than the reference transmission rate as the working frequency for terminal to communicate with a network access device, and at the meantime, sends frequency modification indication information carrying the reference working frequency to the network access device so that the network access device modifies its working frequency for communicating with the terminal to the reference working frequency. In this way, the terminal may transmit data at a transmission rate higher than a reference transmission rate, thereby effectively relieving transmission rate decrease caused by signal strength attenuation, and further improving data transmission performance.

Embodiment 2

Figure 2:
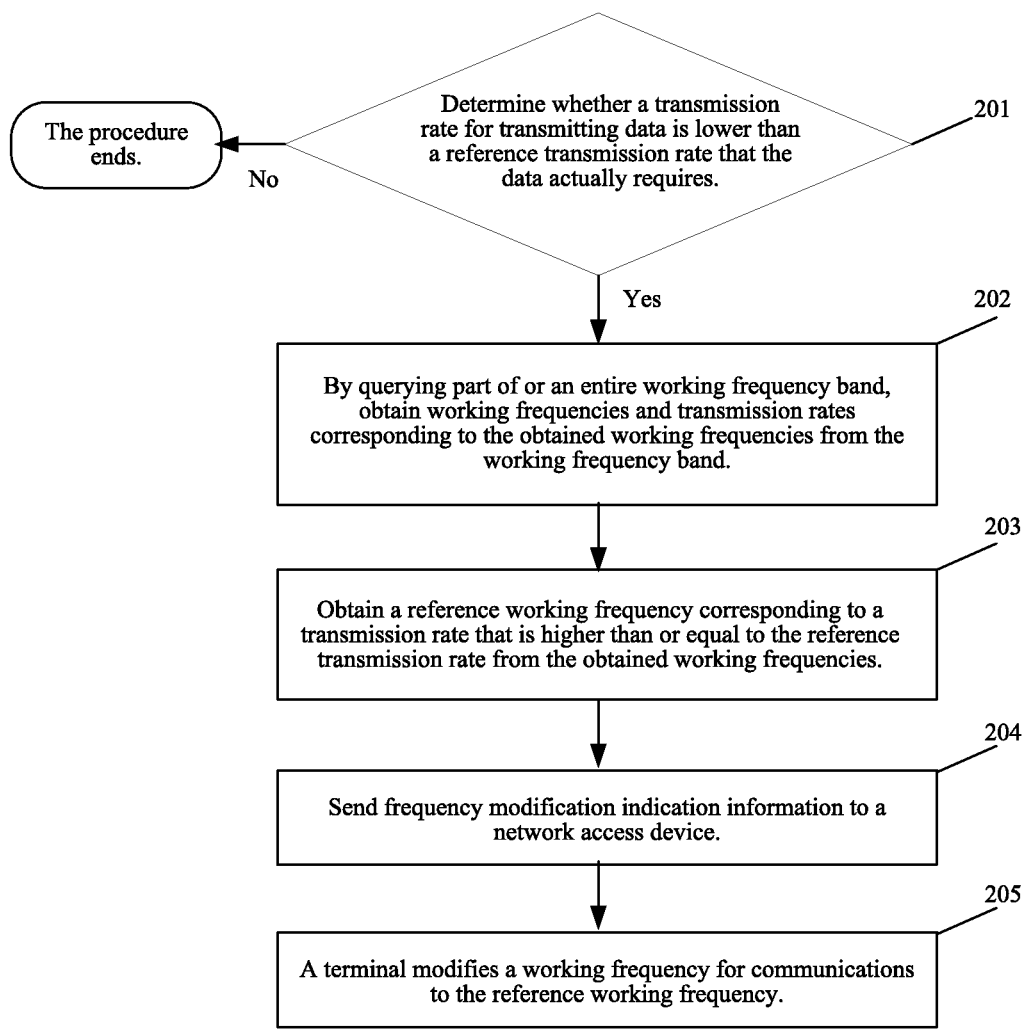
FIG. 2 is a flowchart of a method for improving data transmission performance with a terminal as an executive entity according to an embodiment of the present invention.

As an improvement of an embodiment, this embodiment provides another method for improving data transmission performance, where the executive entity is a terminal. As shown in FIG. 2, the following steps may be included:

Step 201: Determine whether a transmission rate for transmitting data is lower than a reference transmission rate that the data is actually required.

Some services of a terminal have a strict requirement for a transmission rate. A too low transmission rate for transmitting data of a service may result in delayed data transmission of the service or even data loss, thereby further deteriorating user experience of the service.

Specifically, a terminal determines whether a transmission rate for transmitting data is lower than a reference transmission rate. If the transmission rate is lower than the reference transmission rate, it indicates that the transmission rate of the terminal is too low; if the transmission rate is higher than or equal to the reference transmission rate, it indicates that the transmission rate of the terminal may be not too low.

If lower than the reference transmission rate, perform step 202; if higher than or equal to the reference transmission rate, the procedure ends.

Step 202: By querying part of or an entire working frequency band, obtain working frequencies and transmission rates corresponding to the obtained working frequencies from the working frequency band.

A terminal may work on any working frequency of the entire working frequency band. If the transmission rate is lower than the reference transmission rate, it indicates that the transmission rate of the terminal is too low. To ensure that the transmission rate of the terminal is not too low, the terminal may obtain, by querying part of or an entire working frequency band, a reference working frequency corresponding to a transmission rate that is higher than or equal to the reference transmission rate from the working frequency band.

As an implementation manner of this embodiment, a terminal may obtain working frequencies according to a preset frequency interval from the entire working frequency band, and save transmission rates corresponding to the obtained working frequencies.

In other words, if the number of the obtained working frequencies is greater than or equal to 3, a difference value between each two value-adjacent working frequencies among the obtained working frequencies is the same.

This embodiment does not specify the method for saving a working frequency. It may be any method that is familiar to a person skilled in the art, for example, using a memory for saving. The details are not described herein again.

As an implementation manner of this embodiment, if the working frequency band ranges from 4910 MHz to 5835 MHz with a preset frequency interval of 100 MHz, the obtained working frequencies may include: 5010 MHz, 5110 MHz, 5210 MHz, 5310 MHz, 5410 MHz, 5510 MHz, 5620 MHz, 5710 MHz, 5810 MHz.

The less the preset frequency interval is, the greater the number of working frequencies obtained from a working frequency band is. That is, with more precise querying on the working frequency band, the possibility may be increased for the terminal to obtain an optimal working frequency.

To prepare for subsequent steps, obtain and save obtained transmission rates corresponding to working frequencies after a terminal queries a working frequency band.

Further optionally, a terminal may obtain working frequencies from entire or part of a working frequency band according to a preset frequency, that is, obtain a frequency specified by the terminal before querying entire or part of the working frequency band from the entire working frequency band.

This embodiment does not specify the method for obtaining a working frequency from an entire working frequency band, a preset frequency interval and a preset frequency, which may be set according to an actual requirement. The details are not described herein again.

Step 203: Obtain the reference working frequency corresponding to a transmission rate that is higher than or equal to the reference transmission rate from the obtained working frequencies.

To ensure that the transmission rate of the terminal is not too low, the terminal obtains a reference working frequency corresponding to a transmission rate that is higher than or equal to the reference transmission rate from the obtained working frequencies.

The higher a transmission rate is, the better data transmission performance of a terminal is. Therefore, further optionally, the transmission rate corresponding to the reference working frequency obtained by a terminal is higher than or equal to transmission rates corresponding to all the obtained working frequencies.

Or, the reference working frequency may be obtained according to the interference degree of a transmission frequency included in the entire working frequency band and the value of the transmission rate corresponding to each transmission frequency.

For example, a transmission frequency with less interference and higher transmission rate is obtained, and the obtained frequency is determined as a reference working frequency.

This embodiment does not specify the method for obtaining a reference working frequency by a terminal, which may be set according to an actual requirement. The details are not described herein again.

Step 204: Send frequency modification indication information to a network access device, so that the network access device modifies its working frequency for communicating with a terminal that sends the frequency modification indication information to the reference working frequency according to the frequency modification indication information, where the frequency modification indication information includes the reference working frequency.

For the purpose that a network access device may use a reference working frequency to perform data transmission with a terminal, frequency modification indication information that includes a reference working frequency is sent to the network access device, so that the network access device modifies its working frequency for communicating with the terminal that sends the frequency modification indication information to the reference working frequency.

In step 203, the reference working frequency obtained by the terminal may be a working frequency that makes a transmission rate higher than a reference transmission rate. Modifying a working frequency for communication between the network access device that the terminal belongs to and the terminal to the reference working frequency may increase the transmission rate for transmitting data between the terminal and the network access device, and keep the transmission rate higher than the reference transmission rate, or in other words, the transmission requirement of the service data may be satisfied, thereby further ensuring that an experience of a user that uses service data transmitted by the terminal and the network access device does not deteriorates.

Step 206: A terminal modifies the working frequency for communication to a reference working frequency.

When the network access device that a terminal belongs to modifies its working frequency for communicating with the terminal to the reference working frequency, the terminal modifies its working frequency to the reference working frequency at the same time, so that the terminal may use the reference working frequency during data transmission, thereby increasing the transmission rate of the terminal and ensuring that the transmission rate is higher than or equal to the reference working frequency.

Through adopting the solution, after a terminal determines that a transmission rate is lower than a reference transmission rate, obtain working frequencies corresponding to transmission rates that are higher than the reference transmission rate from the entire working frequency band; in addition, the terminal determines a reference working frequency among working frequencies corresponding to transmission rates that are higher than the reference transmission rate as the terminal working frequency for communicating with a network access device, and at the meantime, sends frequency modification indication information carrying the reference working frequency to the network access device so that the network access device modifies its working frequency for communicating with the terminal to the reference working frequency. In this way, the terminal may transmit data at a transmission rate higher than a reference transmission rate, thereby effectively relieving transmission rate decrease caused by signal strength attenuation, and further improving data transmission performance.

Embodiment 3

Figure 3:
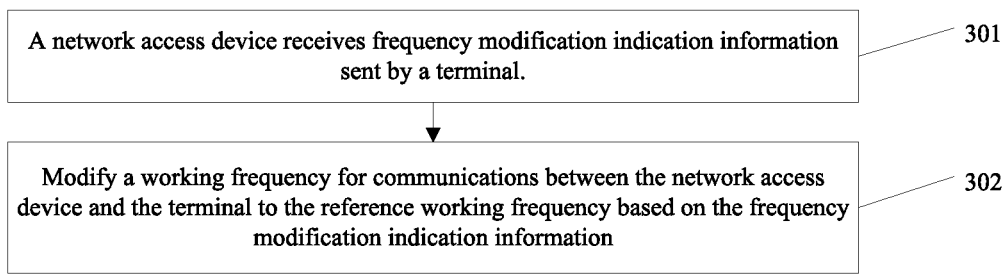
FIG. 3 is a flowchart of a method for improving data transmission performance with a network access device as an executive entity according to an embodiment of the present invention.

This embodiment provides another method for improving data transmission performance, where the executive entity is a network access device. As shown in FIG. 3, the following steps may be included:

Step 301: A network access device receives frequency modification indication information sent by a terminal.

The frequency modification indication information includes a reference working frequency. The reference working frequency is obtained by querying part of or an entire working frequency band from a working frequency band after the terminal determines that a transmission rate for transmitting data is lower than a reference transmission rate that the data is actually required, and the reference working frequency corresponds to a transmission frequency that is higher than or equal to the reference transmission rate.

Further, the transmission rate corresponding to the reference working frequency may be higher than or equal to transmission rates corresponding to all the obtained working frequencies.

Step 302: Modify a working frequency for communication between the network access device and the terminal to the reference working frequency according to the frequency modification indication information.

For the purpose that a network access device may use a reference working frequency to perform data transmission with a terminal, frequency modification indication information that includes a reference working frequency is sent to the network access device, so that the network access device modifies its working frequency for communicating with the terminal that sends the frequency modification indication information to the reference working frequency.

Through adopting the solution, after a terminal determines that a transmission rate is lower than a reference transmission rate, obtain working frequencies corresponding to transmission rates that are higher than the reference transmission rate from the entire working frequency band; in addition, the terminal determines a reference working frequency among working frequencies corresponding to transmission rates that are higher than the reference transmission rate as the terminal working frequency for communicating with a network access device, and at the meantime, sends frequency modification indication information carrying the reference working frequency to the network access device so that the network access device modifies its working frequency for communicating with the terminal to the reference working frequency. In this way, the terminal may transmit data at a transmission rate higher than a reference transmission rate, thereby effectively relieving transmission rate decrease caused by signal strength attenuation, and further improving data transmission performance.

Embodiment 4

Figure 4:
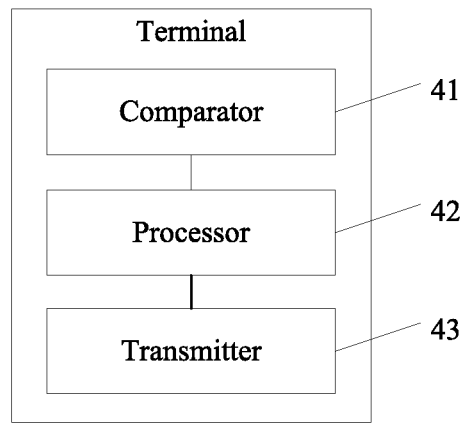
FIG. 4 is a schematic structural diagram of a terminal according to an embodiment of the present invention.

This embodiment provides a terminal, as shown in FIG. 4, where the terminal may include a comparator 41, a processor 42 and a transmitter 43.

Specifically, the comparator 41 is configured to determine whether a transmission rate for transmitting data is lower than a reference transmission rate that the data is actually required, where the comparator sends a notification message to a processor if the comparator determines that the transmission rate for transmitting data is lower than the reference transmission rate.

The processor 42 is configured to obtain, by querying part of or an entire working frequency band, a reference working frequency from the working frequency band according to the notification message sent by the comparator, where the reference working frequency corresponds to a transmission frequency that is higher than or equal to the reference transmission rate, and send the reference working frequency to the transmitter; and modify a working frequency for communication between a network access device and the terminal to the reference working frequency.

The transmitter 43 is configured to receive the reference working frequency sent by the processor and transmit frequency modification indication information to the network access device so that the network access device modifies the working frequency for communication to the reference working frequency according to the frequency modification indication information, where the frequency modification indication information includes the reference working frequency obtained by the processor.

Through adopting the solution, after a comparator determines that a transmission rate is lower than a reference transmission rate, a processor obtains working frequencies corresponding to transmission rates that are higher than the reference transmission rate from the entire working frequency band; in addition, a terminal determines a reference working frequency among working frequencies corresponding to transmission rates that are higher than the reference transmission rate as the terminal working frequency for communicating with a network access device, and at the meantime, a transmitter sends frequency modification indication information carrying the reference working frequency to the network access device so that the network access device modifies its working frequency for communicating with the terminal to the reference working frequency. In this way, the terminal may transmit data at a transmission rate higher than a reference transmission rate, thereby effectively relieving transmission rate decrease caused by signal strength attenuation, and further improving data transmission performance.

Embodiment 5

This embodiment provides another terminal, and is a further extension of the apparatus shown in FIG. 4, as shown in FIG. 4, where the apparatus may include: a comparator 41, a processor 42 and a transmitter 43.

The comparator 41 is configured to determine whether a transmission rate for transmitting data is lower than a reference transmission rate that the data is actually required, where the comparator sends a notification message to a processor if the comparator determines that the transmission rate for transmitting data is lower than the reference transmission rate.

The processor 42 is configured to obtain, by querying part of or an entire working frequency band, a reference working frequency from the working frequency band according to the notification message sent by the comparator, where the reference working frequency corresponds to a transmission frequency that is higher than or equal to the reference transmission rate, and send the reference working frequency to the transmitter; and modify a working frequency for communication between a network access device and the terminal to the reference working frequency.

Further, the processor is further configured to obtain working frequencies and transmission rates corresponding to the obtained working frequencies from the working frequency band, where, if the number of the obtained working frequencies is greater than or equal to 3, a difference value between each two value-adjacent working frequencies among the obtained working frequencies is the same; and obtain a reference working frequency corresponding to a transmission rate that is higher than or equal to the reference transmission rate from the obtained working frequencies.

Further, the processor is further configured to obtain a reference working frequency corresponding to the maximum transmission rate among transmission rates corresponding to the obtained working frequencies.

The transmitter 43 is configured to receive the reference working frequency sent by the processor and transmit frequency modification indication information to the network access device so that the network access device modifies the working frequency for communication to the reference working frequency according to the frequency modification indication information, where the frequency modification indication information includes the reference working frequency obtained by the processor.

After adopting the solution, a terminal and a network access device may transmit data at a transmission rate higher than a reference transmission rate, thereby effectively relieving transmission rate decrease caused by signal strength attenuation, ensuring a sufficient transmission rate, and improving data transmission performance.

Embodiment 6

Figure 5:
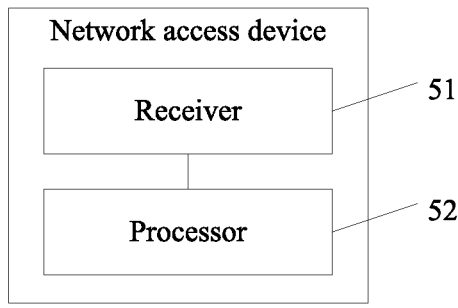
FIG. 5 is a schematic structural diagram of network access device according to an embodiment of the present invention.

This embodiment provides a network access device, as shown in FIG. 5, where the device may include: a receiver 51 and a processor 52.

The receiver 51 is configured to receive frequency modification indication information sent by a terminal, where the frequency modification indication information includes a reference working frequency, the reference working frequency is obtained by querying part of or an entire working frequency band from the working frequency band after the terminal determines that a transmission rate for transmitting data is lower than a reference transmission rate that the data is actually required, and the reference working frequency corresponds to a transmission frequency that is higher than or equal to the reference transmission rate.

The processor 52 is configured to modify a working frequency for communication between the network access device and the terminal to the reference working frequency according to the frequency modification indication information received by the receiver.

After adopting the solution, a terminal and a network access device may transmit data at a transmission rate higher than a reference transmission rate, thereby effectively relieving transmission rate decrease caused by signal strength attenuation, ensuring a sufficient transmission rate, and improving data transmission performance.

Embodiment 7

Figure 6:
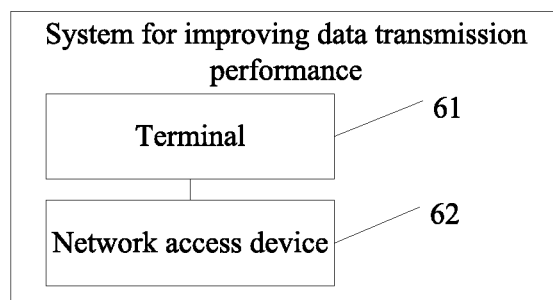
FIG. 6 is a schematic structural diagram of a system for improving data transmission performance according to an embodiment of the present invention.

This embodiment provides a system for improving data transmission performance, as shown in FIG. 6, where the system may include: a terminal 61 and a network access device 62.

The terminal 61 is configured to determine whether a transmission rate for transmitting data is lower than a reference transmission rate that the data is actually required; if lower than the reference transmission rate, by querying part of or an entire working frequency band, obtain a reference working frequency corresponding to a transmission frequency that is higher than or equal to the reference transmission rate from the working frequency band; send frequency modification indication information to the network access device, so that the network access device modifies its working frequency for communicating with the terminal to the reference working frequency according to the frequency modification indication information, where the frequency modification indication information includes the reference working frequency; and modify the working frequency for communication to the reference working frequency.

The network access device 62 is configured to receive the frequency modification indication information sent by the terminal; and modify the working frequency for communication to the reference working frequency according to the frequency modification indication information.

Further, the terminal is further configured to obtain a reference working frequency corresponding to the maximum transmission rate among transmission rates corresponding to the obtained working frequencies.

After adopting the solution, a terminal and a network access device may transmit data at a transmission rate higher than a reference transmission rate, thereby effectively relieving transmission rate decrease caused by signal strength attenuation, ensuring a sufficient transmission rate, and improving data transmission performance.

Through the descriptions of the embodiments, it is clear to persons skilled in the art that the present invention may be implemented by software plus necessary universal hardware, and definitely may also be implemented by hardware, but in many cases, the software implementation is preferred. According to such an understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, a network device, and the like) to perform the methods described in the embodiments of the present invention.

The descriptions are merely specific embodiments of the present invention, but, are not intended to limit the protection scope of the present invention. Any variation or replacement that may be easily figured out by persons skilled in the art within the technical scope disclosed in the present invention shall fall within the protection scope of the present invention. Therefore, the protection scope of the present invention shall be subject to the protection scope of the claims.

What is claimed is:

1. A communication method comprising:
   determining whether a transmission rate for transmitting data is lower than a reference transmission rate that the data is actually required;
   if the transmission rate for transmitting data is lower than the reference transmission rate, obtaining a reference working frequency by querying part of or an entire working frequency band, the reference working frequency corresponding to a transmission rate that is higher than or equal to the reference transmission rate from the working frequency band;
   sending frequency modification indication information to a network access device so that the network access device modifies a working frequency for communication between the network access device and a terminal that sends the frequency modification indication information to the reference working frequency according to the frequency modification indication information, wherein the frequency modification indication information comprises the reference working frequency; and
   modifying the working frequency for communication to the reference working frequency.

2. The method according to claim 1, wherein obtaining the reference working frequency comprises:
   obtaining working frequencies from the working frequency band and transmission rates corresponding to the obtained working frequencies, wherein, if the number of the obtained working frequencies is greater than or equal to 3 frequencies, a difference value between each two value-adjacent working frequencies among the obtained working frequencies is the same; and
   obtaining a reference working frequency corresponding to the transmission rate that is higher than or equal to the reference transmission rate from the obtained working frequencies.

3. The method according to claim 2, wherein the transmission rate corresponding to the reference working frequency is higher than or equal to transmission rates corresponding to all the obtained working frequencies.

4. A method, comprising:
   receiving, by a network access device, frequency modification indication information sent by a terminal, wherein, the frequency modification indication information comprises a reference working frequency obtained by querying part of or an entire working frequency band from the working frequency band after the terminal determines that a transmission rate for transmitting data is lower than a reference transmission rate that the data is actually required, wherein the reference working frequency corresponds to a transmission frequency that is higher than or equal to the reference transmission rate; and
   modifying a working frequency for communication between the network access device and the terminal to the reference working frequency according to the frequency modification indication information.

5. The method according to claim 4, wherein the transmission rate corresponding to the reference working frequency is higher than or equal to transmission rates corresponding to all the obtained working frequencies.

6. A terminal, comprising:
   a comparator;
   a processor; and
   a transmitter;
   wherein the comparator is configured to determine whether a transmission rate for transmitting data is lower than a reference transmission rate that the data is actually required, wherein the comparator is configured to send a notification message to the processor when the comparator determines that the transmission rate for transmitting data is lower than the reference transmission rate;
   wherein the processor is configured to obtain, by querying part of or an entire working frequency band, a reference working frequency from the working frequency band according to the notification message sent by the comparator, wherein the reference working frequency corresponds to a transmission frequency that is higher than or equal to the reference transmission rate, the processor further configured to send the reference working frequency to a transmitter and to modify a working frequency for communication between a network access device and the terminal to the reference working frequency; and wherein the transmitter is configured to receive the reference working frequency sent by the processor and to transmit frequency modification indication information to the network access device so that the network access device modifies the working frequency for communication to the reference working frequency according to the frequency modification indication information, wherein the frequency modification indication information comprises the reference working frequency obtained by the processor.

7. The terminal according to claim 6, wherein the processor is further configured to obtain working frequencies and transmission rates corresponding to the obtained working frequencies from the working frequency band, wherein a difference value between each two value-adjacent working frequencies among the obtained working frequencies is the same, if the number of the obtained working frequencies is greater than or equal to 3 frequencies, and to obtain a reference working frequency corresponding to a transmission rate that is higher than or equal to the reference transmission rate from the obtained working frequencies.

8. The terminal according to claim 7, wherein the processor is configured to obtain a reference working frequency corresponding to the maximum transmission rate among transmission rates corresponding to the obtained working frequencies.

9. A network access device, comprising:

a receiver, configured to receive frequency modification indication information sent by a terminal, wherein the frequency modification indication information comprises a reference working frequency obtained by querying part of or an entire working frequency band from the working frequency band after the terminal determines that a transmission rate for transmitting data is lower than a reference transmission rate that the data is actually required and wherein the reference working frequency corresponds to a transmission frequency that is higher than or equal to the reference transmission rate; and a processor, configured to modify a working frequency for communication between the network access device and the terminal to the reference working frequency according to the frequency modification indication information received by the receiver.

10. A system, comprising the terminal according to claim 6 and the network access device, wherein the network access device is configured to receive the frequency modification indication information sent by the terminal and to modify the working frequency for communication to the reference working frequency according to the frequency modification indication information.

11. The system according to claim 10, wherein the terminal is configured to obtain a reference working frequency corresponding to the maximum transmission rate among transmission rates corresponding to the obtained working frequencies.

* * * * *